(12) United States Patent
Rettberg et al.

(10) Patent No.: US 12,090,569 B2
(45) Date of Patent: Sep. 17, 2024

(54) METHOD OF MANUFACTURING A COMPONENT OF A ROTARY MACHINE AND COMPONENT MANUFACTURED USING SAID METHOD

(71) Applicant: Sulzer Management AG, Winterthur (CH)

(72) Inventors: Robin Rettberg, Winterthur (CH); Thomas Kränzler, Salem (DE); Andreas Würms, Gächlingen (CH)

(73) Assignee: SULZER MANAGEMENT AG, Winterthur (CH)

(*) Notice: Subject to any disclaimer, the term of this patent is extended or adjusted under 35 U.S.C. 154(b) by 0 days.

(21) Appl. No.: 17/083,612

(22) Filed: Oct. 29, 2020

(65) Prior Publication Data

US 2021/0039194 A1 Feb. 11, 2021

Related U.S. Application Data

(62) Division of application No. 15/592,852, filed on May 11, 2017, now Pat. No. 10,857,621.

(30) Foreign Application Priority Data

May 31, 2016 (EP) ..................................... 16172289

(51) Int. Cl.
*B23K 26/00* (2014.01)
*B23K 9/04* (2006.01)
(Continued)

(52) U.S. Cl.
CPC .......... *B23K 26/0093* (2013.01); *B23K 9/044* (2013.01); *B23K 9/167* (2013.01);
(Continued)

(58) Field of Classification Search
CPC . F01D 5/04; F01D 5/048; F01D 9/041; F01D 9/045; F04D 29/284; F04D 29/023;
(Continued)

(56) References Cited

U.S. PATENT DOCUMENTS 5,573,374 A * 11/1996 Giberson .............. B23P 15/006
416/241 R
7,632,073 B2 * 12/2009 Ranz ..................... F04D 29/284
416/213 R
(Continued)

FOREIGN PATENT DOCUMENTS

| CN | 102950318 A | 3/2013 |
|---|---|---|
| EP | 2012957 B1 | 1/2010 |
| EP | 2669042 A1 | 12/2013 |

OTHER PUBLICATIONS

Extended European Search Report issued Nov. 18, 2016 in corresponding European Patent Application No. 16172289.7, filed May 31, 2016.
(Continued)

*Primary Examiner* — Eric J Zamora Alvarez
(74) *Attorney, Agent, or Firm* — GLOBAL IP COUNSELORS, LLP (57) ABSTRACT

A component of a rotary machine formed from a blank, the component includes a center, a boundary surface, and at least one inner passage extending from the center up to the boundary surface and being at least partly closed. The inner passage is formed by a first subtractive machining in which a part of the passage that at least includes an opening of the passage into the boundary surface as well as a cut-out into the top surface is manufactured by machining production, and subsequently the passage is completed by a build-up production on the blank.

8 Claims, 5 Drawing Sheets

(51) Int. Cl.

| | | |
|---|---|---|
| *B23K 9/167* | (2006.01) | |
| *B23K 10/02* | (2006.01) | |
| *B23K 26/342* | (2014.01) | |
| *B23P 15/00* | (2006.01) | |
| *B33Y 10/00* | (2015.01) | |
| *B33Y 80/00* | (2015.01) | |
| *F01D 5/34* | (2006.01) | |
| *F04D 9/04* | (2006.01) | |
| *F04D 29/22* | (2006.01) | |
| *F04D 29/28* | (2006.01) | |
| *F04D 29/44* | (2006.01) | |
| *B23K 101/00* | (2006.01) | |
| *F01D 5/04* | (2006.01) | |
| *F01D 9/04* | (2006.01) | |

(52) U.S. Cl.
CPC .......... *B23K 10/027* (2013.01); *B23K 26/342* (2015.10); *B23P 15/006* (2013.01); *B33Y 10/00* (2014.12); *B33Y 80/00* (2014.12); *F04D 29/2227* (2013.01); *F04D 29/284* (2013.01); *B23K 2101/001* (2018.08); *F01D 5/04* (2013.01); *F01D 9/041* (2013.01); *F04D 29/22* (2013.01); *F04D 29/444* (2013.01); *F04D 29/448* (2013.01); *F05D 2230/10* (2013.01); *F05D 2230/22* (2013.01); *F05D 2230/31* (2013.01); *F05D 2230/50* (2013.01); *F05D 2230/53* (2013.01)

(58) Field of Classification Search
CPC .. F04D 29/2222; F04D 29/281; F04D 29/624; F04D 29/2227; F04D 29/22; F04D 29/444; F04D 29/448; F05D 2230/10; F05D 2230/22; F05D 2230/31; F05D 2230/50; F05D 2230/53; B23K 26/0093; B23K 26/342; B23K 9/044; B23K 9/167; B23K 10/027; B23K 2101/001; B33Y 10/00; B33Y 40/00; B33Y 80/00; B23P 15/006

See application file for complete search history.

(56) References Cited

U.S. PATENT DOCUMENTS

| | | |
|---|---|---|
| 2009/0110556 A1 | 4/2009 | Jahnz et al. |
| 2011/0318183 A1 | 12/2011 | Noronha et al. |
| 2015/0017001 A1 | 1/2015 | Ahn |
| 2015/0017013 A1* | 1/2015 | Tozzi .................. B22F 10/73 416/227 R |
| 2015/0196971 A1 | 7/2015 | Schneider et al. |
| 2015/0267543 A1 | 9/2015 | Gerber et al. |
| 2016/0010469 A1 | 1/2016 | Guo |
| 2018/0079038 A1 | 3/2018 | Rettberg |
| 2018/0080325 A1 | 3/2018 | Rettberg |

OTHER PUBLICATIONS

Fritz Klocke, et al., "Turbomachinery component manufacture by application of electrochemical, electro-physical and photonic processes", XP029041329, CIRP Annals—Manufacturing Technology, 63, 2014, pp. 703-726.
Machine Translation of EP 2669042 A1 (Year: 2013).

* cited by examiner

METHOD OF MANUFACTURING A COMPONENT OF A ROTARY MACHINE AND COMPONENT MANUFACTURED USING SAID METHOD

CROSS-REFERENCE TO RELATED APPLICATION

This application is a divisional application of U.S. patent application Ser. No. 15/592,852, filed May 11, 2017, which claims priority to European Application No. 16172289.7, filed May 31, 2016, the contents of each of which are hereby incorporated herein by reference.

BACKGROUND

Field of the Invention

The invention relates to a method of manufacturing a component of a rotary machine and to a component of a rotary machine.

Background of the Invention

In the manufacture of rotary machines such as pumps, turbines, compressors, compactors or expanders, it is known to work rotating rotors, pump wheels, impellers and stationary diffusers or guide wheels as components out of blanks by cutting or machining processes, for example by milling. In this respect, the blank can be present as solid material or can already be pre-worked by a primary shaping process.

Such a method is known, for example, from EP-B-2 012 957. The method proposed is in particular characterized in that it allows a cutting manufacture of the component, by which it is meant that the component as a whole is at least substantially brought into the desired end shape from the blank by a cutting apparatus. The joining together of pre-fabricated elements of the component, for example by welding, is no longer necessary with such an integral manufacture. This is in particular advantageous because weld seams or other connection points represent a weak point at heavily loaded parts of the component in the operating state that can be the cause of a crack or of different damage, for example caused by corrosion, to the component.

A cutting manufacture is thus in particular possible with highly loaded components without the joining together of individual elements. Such components as rotors (impellers) of pumps, for example, are therefore produced from solid material, depending on the application e.g. from high-strength stainless steels, super alloys, other suitable metals or metal alloys or also from non-metallic materials, for example ceramic materials, and the blades and channels of the impeller are worked out of this material by cutting machining, e.g. by milling.

As is also already shown in EP-B-2 012 957, however, a total cutting manufacture of the component is sometimes not possible for purely geometrical reasons. This can be the case, for example, when the impellers are configured as covered or closed impellers. With such an embodiment, the impeller comprises a hub plate on which the blades are arranged and furthermore comprises a top plate that covers the blades on their side remote from the hub plate fully or at least partly. At least partly closed passages are thus formed between the blades and respectively extend from the center of the impeller up to its outer radial boundary surface.

SUMMARY

Even if it is considered that these passages can be milled or machined from the blank in a cutting process from both sides, that is from the inner space of the impeller and from its radial boundary surface, using a cutting apparatus, it is clear that the geometry sets limits here and makes a total cutting manufacture impossible in many cases.

In such cases in which it is also no longer possible or practical for purely geometrical reasons to mill the impeller in total in one piece of solid material, it is therefore prior art first to work the hub plate and the blades out of the blank in a cutting manner. The passages between the blades are then open passages that can be manufactured in a simple manner. The top plate is subsequently placed on and is joined, for example welded, to the hub plate or to the blades. The weld seams or the join points then respectively extend where the blades come into contact with the top plate. However, this brings about the disadvantage that the loads are particularly high or critical at just this point in the operating state. This border region between the blades and the top plate is particularly prone to joining defects that are sometimes not even noticed during the manufacture.

It is alternatively also known to produce the regions of the passages no longer accessible to milling using an eroding process, for example spark erosion (EDM: electrical discharge machining). These methods are, however, comparatively slow and cost-intensive as a rule.

It is also prior art to manufacture such components having inner passages in a technical molding manner, wherein the inner passages are then produced by a corresponding embodiment of the mold or of the casting cores. A cast component has the disadvantage, however, that defects in the structural conditions may occur during molding, for example, that have a negative effect on the load capacity or on the stability of the component. As a rule, the achievable surface qualities and the dimensional accuracies of the regions no longer accessible to milling are furthermore limited in the molding process.

A method for the cutting manufacture of a closed impeller is therefore proposed in EP-A-2 669 042 in which the component to be produced (impeller) is divided into two sub-volumes that are adjacent to one another at an interface. In this respect, the sub-volumes are fixed such that the interface does not include or cut any of the boundary surfaces of the passages and such that the passages as a whole can be worked out of the first sub-volume that later comprises the complete passages by a cutting method, e.g. milling. The second sub-volume, that is then only part of the top plate, is either manufactured as a separate element and is joined to the first sub-volume after the completion of the passages or the second sub-volume is built up on the first sub-volume by a depositing machining method, for example by deposit welding. It should hereby be made possible, on the one hand, to produce the passages completely by a cutting manufacture and it should be avoided, on the other hand, that the interface intersects or bounds the passages such that no join defects can occur between the blades and the top plate. This method is, however, also still subject to geometrically caused limits.

This problem explained with reference to closed impellers is, however, also present with other components that have an inner passage whose position or geometry is such that a total cutting manufacture is in particular not possible or not practical for geometrical reasons. Closed stators, diffusers or also cooling passages, for example for cooling air, in turbine blades, can be named as examples here.

Starting from this prior art, it is therefore an object of the invention to provide a different method of manufacturing a component of a rotary machine that has at least one inner passage, by which method in particular those components can also be manufactured that do not allow any total cutting manufacture of the passage for geometrical reasons, wherein the method should enable a high reliability of the component in the operating state. A corresponding component should furthermore be provided by the invention.

The subjects of the invention satisfying this object are characterized by the features described herein.

In accordance with the invention, a method is therefore provided for manufacturing a component of a rotary machine, which component has at least one inner passage that extends from a center up to a boundary surface of the component and is at least partly closed, wherein a blank is provided that comprises the boundary surface and a top surface, wherein a first subtractive machining step is carried out in which a part of the passage that at least comprises an opening of the passage into the boundary surface as well as a cut-out in the top surface is manufactured by cutting production, and wherein subsequently the passage is completed by build-up production on the blank.

The method in accordance with the invention thus advantageously combines a subtractive machining in which material is removed from the blank with an additive or build-up manufacturing or machining in which material is deposited. In this respect, only a part of the passage is manufactured by a cutting production, whereas the remainder of the passage is generated by a build-up production. It is possible by this combination to generate a passage having—at least almost—any desired geometry.

Since the blank does not have to be manufactured in a technical casting process, the blank can advantageously comprise a forged material that is then machined in a cutting process. All the advantages of the forged material are maintained by the cutting machining. In this respect, at least the opening of the passage into the boundary surface of the component is manufactured in a cutting process in the first subtractive machining step. With a component of a rotary machine, for example with a closed impeller, this opening or the walls bounding it is/are typically that region that is exposed to the greatest loads by the flowing fluid in the operating sate. With the impeller of a pump, this region comprises the outlet edge of the blade that bounds the inner passage that is flowed through by the fluid. It is known that the greatest mechanical or hydrodynamic loads occur at the outlet edge of the blade in the operating state with the impeller of a pump. Since this opening of the passage is manufactured in a cutting process, all the advantageous properties of the forged material which the blank comprises are maintained. The region of the opening is thereby characterized by a particularly high mechanical load capacity and stability. Such machining processes such as welding that bring about a high heat input into the material that could have a negative effect on the properties and on the structural conditions can in particular be dispensed with at the opening.

In addition, in the first subtractive machining step, a part of the passage is manufactured in a cutting process as a cut-out in the top surface of the blank, with this part being connected to the opening of the passage into the boundary surface. Only a part of the passage that starts as a recess in the top surface of the blank and extends up to the opening in the boundary surface is thus completed after the end of the first subtractive machining step. In this respect, the first subtractive machining step can comprise either a milling from the boundary surface or a milling from the top surface of the blank. It is naturally in particular also possible that the first subtractive machining step comprises both a milling or a cutting machining from the top surface and a milling from the boundary surface.

Once the first subtractive machining step has ended, the passage is completed by a build-up production and the component is brought into its final shape.

The cut-out in the top surface is preferably produced in the first subtractive machining step such that it extends up to the center where the passage starts. Since the top surface of the blank is freely accessible to a cutting apparatus, it is advantageous to configure the passage as a cut-out in the top surface up to its end disposed at the center in the first subtractive machining step. However, this does not mean that the passage is thereby completed. The region of the passage close to the center is then only configured as a cut-out in the top surface and not yet as a closed or inner passage. The base surface of the passage and, optionally, parts of its lateral boundary walls are generated by this cutting machining while the completion is only made subsequently by the build-up production.

In a preferred embodiment, the component comprises a plurality of inner passages of which each extends out of the center up to the boundary surface, wherein adjacent passages are each separated by a partition wall, wherein a respective part of the passage is manufactured in the first subtractive machining step of each passage, said part at least comprising an opening of the passage into the boundary surface and a cut-out in the top surface, and wherein each partition wall is only completed by the build-up production. It is particularly preferred in this respect if the opening of each passage into the boundary surface is configured in the first subtractive machining step such that the opening of the respective passage is already configured as covered or closed by the top surface of the blank. The openings then respectively represent openings in the boundary surface bounded at all sides.

The blank is preferably a solid body, and in particular a rotationally symmetrical body, i.e. the blank has no inner cavities. A cylindrical axial and continuous bore can, however, preferably be provided in the center of the blank and serves, for example, to fix the completed component to a shaft, e.g. to the drive shaft of a pump. I.e. the top surface of the blank preferably has at most one central opening before the first subtractive machining step that is arranged radially inwardly disposed such that each start of a passage disposed at the center is separated from the central opening by a ring body in the completed state of the component.

In accordance with a particularly preferred embodiment, the first subtractive machining step is carried out such that the top surface of the blank has a contiguous, ring-shaped region after its completion that is adjacent to the boundary surface and that covers all the openings such that all the openings are already configured as closed parts of the respective passages. This means that all the openings of the passages and the walls respectively bounding them are already manufactured in the end shape of the component to be manufactured in the first subtractive machining step. This has the advantage that those opening regions of the passages that are exposed to the highest strains in the operating state have a particularly high load capacity and thus also a high reliability in operation because these opening regions are manufactured in a purely cutting process and are thus not exposed to any high heat input in the production process such as would, for example, be caused by welding, thermal injection or other methods.

The build-up production preferably takes place layer-wise. It is possible in this respect that each layer is oriented perpendicular to an axial direction. It is naturally also possible to apply the layers in other alignments, that is such that the respective surface normal of the layer is aligned obliquely to the axial direction. This means that the additive build-up on the blank takes place after the end of the first subtractive machining step by a successive application of material layers until the component is completed. The application of layers takes place in a preferred variant such that the individual layers are rotationally symmetrical. This is in particular also possible when the layers are oriented perpendicular to the axial direction, but also on a layer application in which the individual layers are oriented obliquely to the axial direction.

A further preferred measure comprises the build-up production comprises a plurality of additive machining steps to successively build up the component.

It is particularly preferred if at least one further subtractive machining step is carried out between the additive machining steps. The structure built up in the preceding additive machining step can then be reworked e.g. by milling, grinding or polishing in this further subtractive machining step. A surface optimization or a particularly faithful geometry can be achieved by this measure.

It is especially preferred that a respective further subtractive machining step is carried out between two additive machining steps. This means that the additive machining steps and the further subtractive machining steps are carried out alternately. This allows a particularly high precision and surface quality of the component to be produced.

Machining apparatus are known today with which both additive production processes, for example laser build-up welding, and subtractive production processes, for example milling or grinding, can be carried out. Such apparatus, for example, have different machining heads that can be automatically exchanged, with one machining head being configured for laser build-up welding, for example, while another machining head is configured for milling. Exactly such machining apparatus allow a fast and problem-free change between subtractive and additive machining processes without the workpiece to be machined having to be reclamped or transferred into another machining station for this purpose. This allows a particularly fast, inexpensive and high-quality manufacture of components that are produced in a very precise manner.

A further preferred measure comprises the component being built up element by element after the first subtractive machining step, with initially only each partition wall preferably being completed. All the partition walls are thus, for example, first completely built up between the passages after the end of the first subtractive machining step and the still missing parts are only subsequently built up, e.g. those parts that turn the passages into closed passages.

It is particularly preferred for technical process reasons if the build-up production is carried out with the aid of a laser.

Applications that are particularly relevant to practice are when the component is configured as a impeller, as a stator or as a diffuser of a rotary machine, in particular of a pump, of a turbine, of a compressor, of a compactor or of an expander.

A component of a rotary machine is furthermore provided by the invention that is manufactured in accordance with a method in accordance with the invention.

In accordance with a preferred embodiment, each partition wall is configured as a blade.

Applications that are particularly relevant to practice are when the component is configured as a impeller, as a stator or as a diffuser of a rotary machine, in particular of a pump, of a turbine, of a compressor, of a compactor or of an expander.

Further advantageous measures and embodiments of the invention result from the dependent claims.

BRIEF DESCRIPTION OF THE DRAWINGS

The invention will be explained in more detail hereinafter with reference to the drawings.

DETAILED DESCRIPTION OF THE EMBODIMENTS

The method in accordance with the invention serves for the manufacture of a component of a rotary machine, wherein the component has at least one inner passage that extends from a center up to a boundary surface of the component and is at least partly closed. In this respect, a closed passage means a passage that is completely closed with the exception of an inlet or of an outlet, that is, is configured as tubular, that is the passage is bounded everywhere by one or more walls perpendicular to its main direction of flow. Unlike this, an open passage means one that is not bounded by a wall, but is open, in a direction perpendicular to its main direction of flow, that is in a direction perpendicular to its longitudinal extent. A passage having a U-shaped or V-shaped wall is thus an open passage, for example. If the open side of the U section or of the V section were to be covered by a top, the passage would be a closed passage.

A partly closed passage then means one that is configured partly as a closed passage and partly as an open passage.

Figure 1:
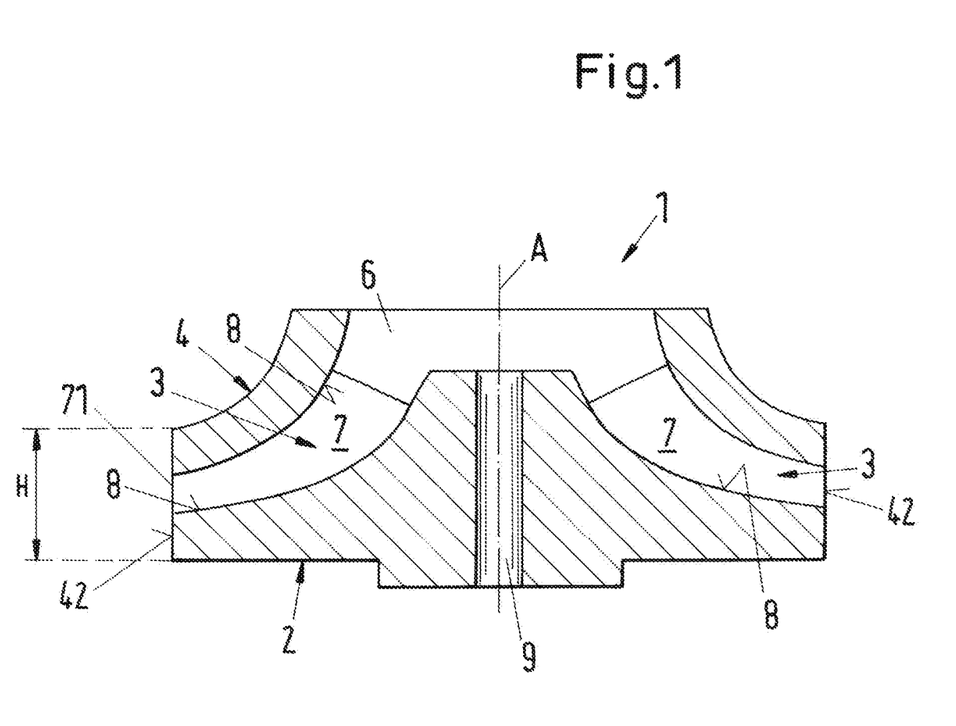
FIG. 1 is an axial sectional representation of an embodiment of a closed impeller.

In the following description of the invention, reference is made with exemplary character to an example important for practice in which the component is a closed or covered impeller (rotor) of a turbo-machine, e.g. of a pump. For a better understanding, FIG. 1 shows an axial sectional representation of an embodiment of a closed impeller that is provided as a whole with the reference numeral 1 and that can be manufactured by a method in accordance with the invention.

In the operating state, the impeller rotates about an axis of rotation that fixes an axial direction A. A direction perpendicular to this axial direction A is called a radial direction. FIG. 1 shows the impeller 1 in a sectional representation along the axial direction A. The impeller 1 comprises in a manner known per se a hub plate 2 by which the impeller 1 is typically mounted or fastened to an axle or shaft, not shown, as well as furthermore a plurality of blades 3 that are arranged on the hub plate 2 and a top plate 4 that at least partly covers the blades 3 at their side or edge remote from the hub plate 2. In this respect, the top plate 4 extends higher than the hub plate 2 in accordance with the representation (FIG. 1) with respect to the axial direction A. An inner space 6 is thereby formed above the blades 3 in accordance with the representation that is bounded by the top plate 4 with respect to the radial direction. This inner space 6 represents the inlet through which a fluid flows onto the impeller 1 in the operating state. A respective inner passage 7 that is configured as an at least partly closed passage 7 and that is here configured as a closed passage is present between two adjacent blades 3 and respectively extends from a center that is formed by the inner space 6 up to a boundary surface 42 of the impeller 1. The boundary surface 42 represents the radially outer surface of the impeller 1 that extends in parallel with the axial direction A, that is the surface that bounds the impeller in the radial direction. The boundary surface 42 comprises the radially outer surfaces of the top plate 4 and of the hub plate 2 as well as the radially outer end edges of the blades 3 that are called outlet edges 31 (see FIG. 3).

It is naturally also possible in dependence on the embodiment of the component that the end edges of the blades 3 are set back with respect to the radial direction, that is are not disposed in the boundary surface 42. The top plate 4 and/or the hub plate 2 then project beyond the blades 3 or beyond the end edges of the blades 3 with respect to the radial direction. Such an embodiment is in particular also possible with an impeller of a turbine in which the outer end edges of the blades 3 typically represent the inlet edges.

Each of the closed passages 7 is thus surrounded by a boundary surface 8 that is respectively composed of the mutually facing surfaces of two adjacent blades 3 as well as of the interposed surface segments of the mutually facing surfaces of the hub plate 2 and of the top plate 4. The blades 3 therefore each form a partition wall between two adjacent inner passages 7. Each passage 7 comprises an opening 71 with which it opens into the boundary surface 42. Openings 71 adjacent in the peripheral direction are each separated from one another by an outlet edge 31.

The impeller 1 additionally has a central axial bore 9 that serves for receiving a shaft or an axle on which the impeller 1 can be mounted.

Figure 2:
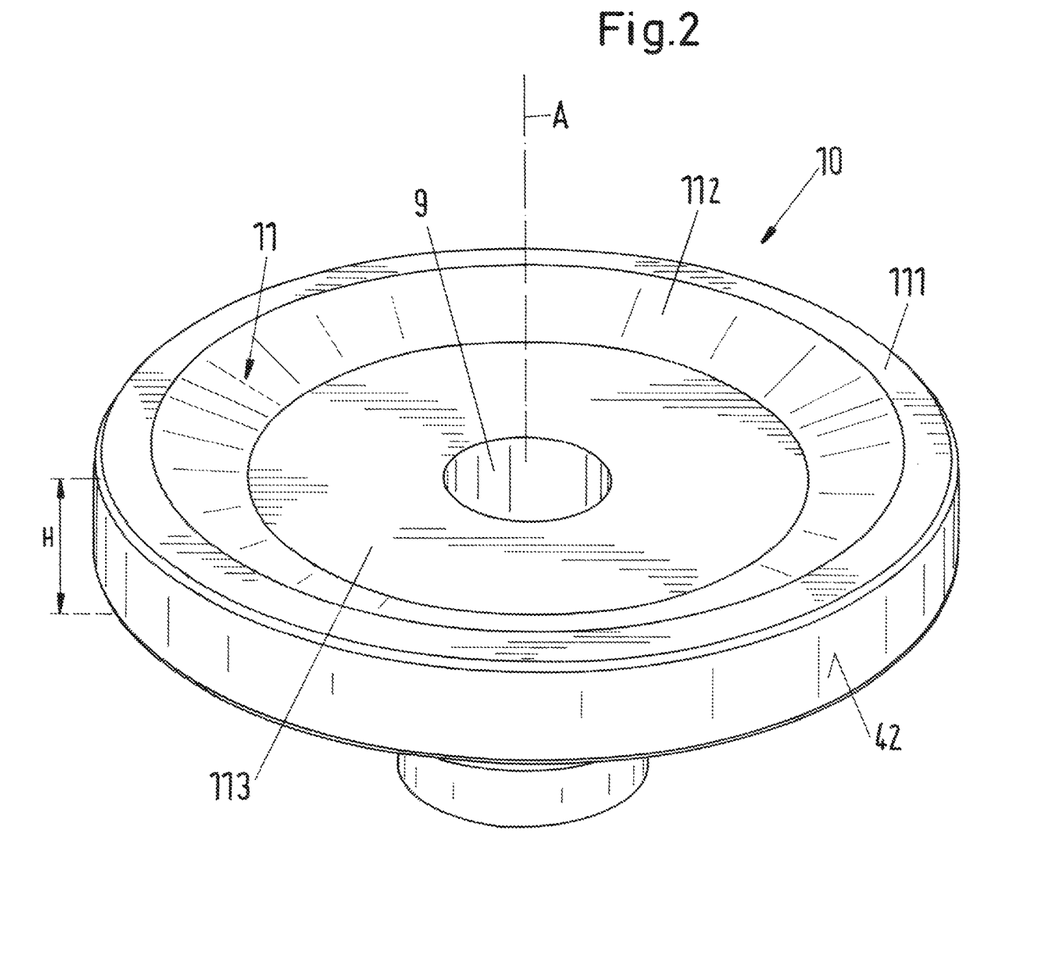
FIG. 2 is a perspective representation of an embodiment of a blank for the carrying out of an embodiment of a method in accordance with the invention.
Figure 3:
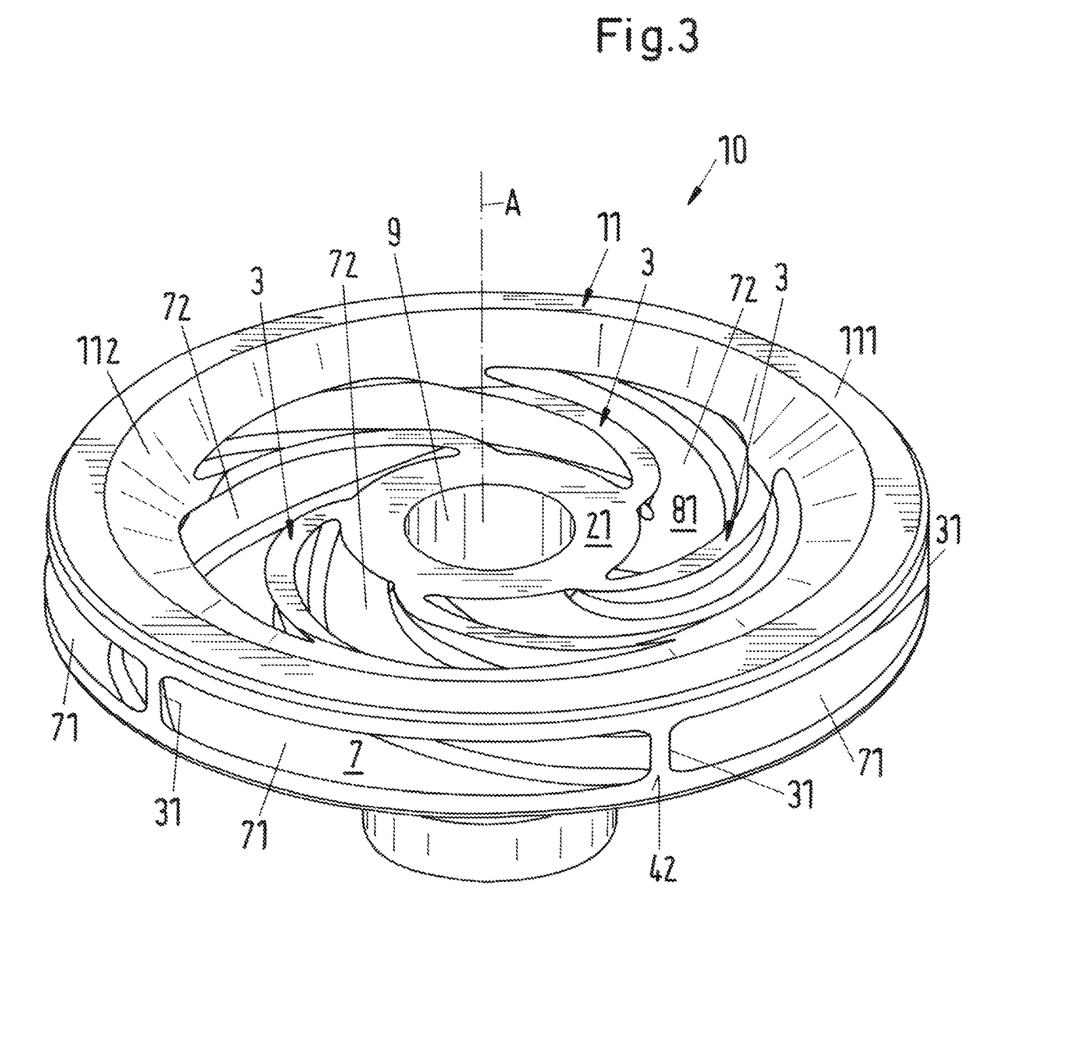
FIG. 3 is a perspective representation of the blank of FIG. 1 after the end of the first subtractive machining step.

An embodiment of the method in accordance with the invention will be explained in more detail in the following with reference to FIGS. 2-4. A blank is first provided in accordance with the method in accordance with the invention. FIG. 2 shows, in a perspective representation, an embodiment of such a blank which is designated as a whole by the reference numeral 10. The blank 10 comprises the boundary surface 42 as well as a top surface 11 that bounds the blank 10 in the axial direction A.

The blank particularly preferably comprises a forged material that can be a metal or a metal alloy. Steel in its known embodiments is thus suitable, for example, or aluminum, titanium, nickel, a nickel or cobalt base alloy or a non-ferrous metal. Other forged materials are naturally also possible, for example a cast material, a plastic or a composite material or another cuttable material.

The blank 10 is configured as a solid body, that is in particular without inner cavities—apart from the optionally already present central axial bore 9. The blank 10 is in this respect manufactured or machined such that it already comprises a part of the hub plate 2 as well as a part of the top plate 4, with these parts each being configured—apart from the passages—in their desired end shape or at least substantially in their end shape. "Substantially" in this context means that post-machining can naturally still be carried out at a later point in time, such as polishing, grinding or similar, but the substantial shape is already completed with the blank 10.

The same also applies accordingly to the boundary surface 42. This is also already in its end shape or substantially in its end shape apart from the openings 71 of the passages 7. This in particular means that the extent H of the boundary surface 42 in the axial direction A is already the one that has the completed component. The top surface 11 can be configured as a planar circular surface that is oriented perpendicular to the axial direction A and that optionally has a central opening that is generated by the central axial bore 9.

In the embodiment described here, however, the top surface 11 is not configured as a planar surface. The top surface 11 comprises a ring-shaped region 111 that is outwardly disposed with respect to the radial direction, that is adjacent to the boundary surface 42 and that is preferably oriented perpendicular to the axial direction A. A region 112 of a conical surface shape adjoins the ring-shaped region 111 in a radially inwardly disposed manner and forms an inwardly directed taper. A circular central ring region 113 adjoins the region 112 of conical surface shape in a radially inwardly disposed manner, surrounds the central axial bore 9 coaxially and is likewise oriented perpendicular to the axial direction A. This means that the ring-shaped region 111 and the central ring region 113 are coaxial, with the central ring region 113 being lower with respect to the axial direction A in accordance with the representation than the ring shaped region 111 and being connected thereto via the region 112 of conical surface shape. The blank 10 therefore has a recess in its top surface 11 overall.

It is naturally also possible that the ring-shaped region 111 or the central ring region 113 is not oriented perpendicular to the axial direction. This can be advantageous, for example, on the production of semi-axial impellers.

Apart from the central opening, the top surface 11 is configured as a contiguous surface that has no further openings. The radially outwardly disposed ring-shaped region 111 preferably forms a part of the top plate 4 of the finished component 1.

The blank 10—as also shown in FIG. 2—is particularly preferably configured as rotationally symmetrical with respect to the axial direction A.

A first subtractive machining step is now carried out at this blank 10 and will be explained in the following. FIG. 3 shows a perspective representation of the blank 10 after the end of the first subtractive machining step. The first subtractive machining step is specifically carried out by cutting production.

A subtractive machining step in this respect means that material is stripped or removed from the workpiece—here the blank 10—in such a machining step. A cutting production as generally customary means a production in which excess material is cut off from the blank 10 or from the workpiece in a form of chips to achieve a desired geometrical shape. Cutting production processes are, for example, milling, turning, drilling, planing, filing, grinding, honing or lapping, to name just a few examples.

The first subtractive machining step preferably comprises a milling by a cutting apparatus that, for example, comprises a computer-controlled milling tool. The cutting apparatus is particularly preferably configured at least as a five-axis milling machine with which the desired geometrical shape is worked out of the blank 10. The milling tool is typically guided by a manipulator, with the guidance taking place in a computer-assisted manner.

In the first subtractive machining step, a part of each passage 7 is manufactured that at least comprises the opening 71 of the passage 7 into the boundary surface 42 as well as a cut-out 72 in the top surface 11 of the blank. As FIG. 3 shows, the region of the opening 71 of the passage 7 is in this respect configured as a closed passage section. The openings 71 are each milled into the boundary surface 42, with adjacent openings 71 each being separated from one another by an outlet edge 31. The radially outwardly disposed ring-shaped region 111 of the top surface 11 of the blank 10 in this respect covers each of the openings 71 of the passages 7 such that all the passages 7 are closed by the ring-shaped region 111. This means that, after the end of the first subtractive machining step (see FIG. 3), the top surface 11 of the blank 10 comprises the ring-shaped section 111 that is adjacent to the boundary surface 42 and is configured as a ring-shaped contiguous surface that has no opening, that is, is continuous with respect to the peripheral direction and that covers all the openings 71 of the passages 7.

The cut-outs 72 that are produced in the top surface 11 of the blank, that is in the central ring region 113 and in the region 112 of conical surface shape in the embodiment described here, form still open passage regions of the passages 7 subsequently still to be completed after this first subtractive machining step. Each cut-out 72 is milled such that its base surface 81 already has substantially the final shape for the passage 7, that is in particular also already comprises the geometrical extent of the respective passage 7.

Each cut-out 72 is preferably produced in the first subtractive machining step such that it extends up to the center, here to the inner space 6, where the passage 7 starts. Each cut-out 72 starts in a radially inwardly disposed manner spaced apart from the central opening that is generated from the central axial bore 9, i.e. none of the cut-outs 72 is connected to or opens into this opening. Each start of a passage 7 disposed in the center—here the inner space 6—is thus separated from the central opening of the bore 9 by a ring body 21. In the completed state, this ring body 21 forms a part of the hub plate 2.

The cut-outs 72 and the openings 71 are milled in the first machining step such that they are connected to one another, i.e. each cut-out 72 merges into the region that comprises the respective opening 71 of the associated passage 7.

After the end of the first subtractive machining step (see FIG. 3), the blank 10 therefore has the following shape: The opening 71 of each passage 7 is already configured at least substantially in the shape of the finished component 1 in the boundary surface 42 and is covered by the ring-shaped region 111 of the top surface 11 of the blank 10. The respective passage 7 extends from the respective passage 71 into the interior of the blank 10 and merges into the respective cut-out 72 that is open at the top in accordance with the illustration (FIG. 3) and that extends up to the start of the respective passage 7 disposed at the center, with the base surface 81 of each cut-out 72 already at least substantially having the configuration of the base surface of the finished passage 7. While the passages 7 therefore are already in their final shape or at least substantially in their final shape in the region of their openings 71, the radially inwardly disposed region of each passage 7 that comprises the upwardly open cut-out 72 is still not yet completed in its final shape.

The same applies accordingly to the partition walls 3 that later form the blades 3 of the impeller 1 and that each separate two adjacent passages 7 from one another. In the region of the boundary surface 42, each partition wall 3 already has its final shape or at least substantially final shape, that is the outlet edge 31 of each partition wall 3 is in particular already completed and is at least substantially present in its final configuration. In the radially inwardly disposed region of the blank 10, the partition walls 3 are each only partly present; they are therefore not yet finished and in particular have not yet reached their final height with respect to the axial direction A.

It is understood that the first subtractive machining step can comprise both a milling starting from the top surface 11 and a milling starting from the boundary surface 42. In this respect, it is advantageous for many applications if the cut-outs 72 are milled starting from the top surface 11 and if the openings 71 are milled starting from the boundary surface 42. Depending on the component 1, it is naturally also possible that machining only takes place in the first subtractive machining step starting from the top surface 11 or only starting from the boundary surface 42 in a milled or cutting manner.

A particular advantage of the embodiment described here comprises in particular the region of the openings 71 having the outlet edges 31 disposed therebetween and the ring-shaped region 111 that covers the openings 71 and that is part of the top plate 4 already being in their final shape or at least substantially in their final shape after the first subtractive machining step. Particularly the outlet edges 31 and specifically the interface between the outlet edges 31 and the top plate 4 are the critical regions in which the highest loads occur in the operating state and where crack formations, degradations or other disadvantageous wear or fatigue phenomena are most likely to occur. Since these critical regions can be manufactured with the aid of cutting production processes in the method in accordance with the invention, they can be produced with an extremely high precision, on the one hand, and such production methods that bring about a very high heat input into the material, e.g. welding or joining processes with which elements are permanently connected, can be completely dispensed with in these critical regions, on the other hand, These methods with high heat input can namely result in joining defects or unwanted changes in the structural conditions that have a negative effect on the load capacity of the component.

A further advantage of purely cutting production is that with a blank 10 of a forged material, all the positive properties of the forged material are maintained.

Figure 5:
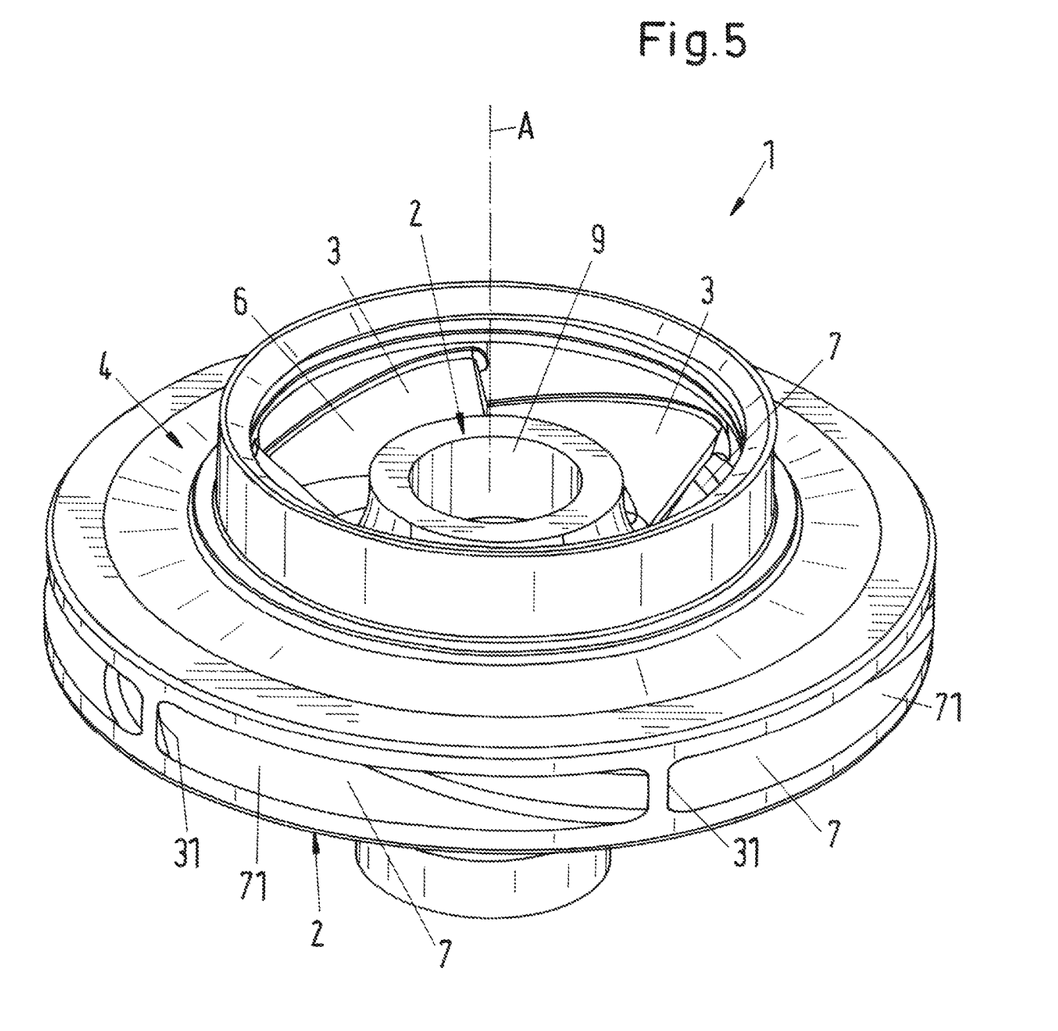
FIG. 5 is a perspective representation of the completed component that is manufactured from the blank in accordance with FIG. 1 and FIG. 2.

Once the first subtractive machining step is ended (see FIG. 3), the still missing parts of the component 1 are manufactured by a build-up production and the component 1 is brought into its final shape. FIG. 5 shows in a perspective representation the completed component 1, that is here the covered impeller 1.

The build-up production comprises one or more additive machining steps. An additive machining step or an additive production that is also called generative production, in this respect means a machining step in which material is applied to or deposited on the workpiece, that is the blank 10 here. The desired structures are typically generated, e.g. by building up on a workpiece, in an additive production from a formless material, for example liquids or powders, or also from a neutral-shape material, for example band-shaped or wire-shaped material, by chemical and/or physical processes. Additive production methods for metallic materials known per se are, for example, build-up welding processes, specifically inert gas processes such as tungsten inert gas welding (TIG) or laser build-up welding or plasma processes or selective laser melting (SLM).

Once the first subtractive machining step has therefore been ended, the still missing regions of the component 1, they are in particular parts of the partition walls 3, parts of the cover for closing the passages 7—that is in the embodiment described here parts of the top plate 4—and parts of the hub plate 2—are generated in build-up production.

The still missing region of the partition walls 3 (blades 3) and the missing regions of the top plate 4 and of the hub plate 2 are, for example, generated by selective laser melting. In this method known per se, the material to be processed is applied to the blank 10 in a thin film in powder form. The powdery material is melted on locally completely by laser radiation and forms a solid material film after its solidification. The blank 10 is subsequently lowered by the amount of a layer thickness and material is again applied in powder form that is then again locally melted by laser radiation. This cycle is repeated for so long until the component 1 is completed. It is naturally possible that post-machining such as grinding, polishing or similar can subsequently still take place.

In another preferred embodiment, the still missing parts are generated in build-up production by laser build-up welding. The method of laser build-up welding with its different variants is sufficiently known to the skilled person and therefore does not require any explanation here.

It is possible in this respect to carry out the build-up production layer-wise and in particular while utilizing the rotationally symmetrical configuration of the blank 10.

It is another likewise preferred embodiment to build up the component 1 element by element in build-up production, i.e. the individual elements of the component 1 such as the partition walls 3 or the covers of the passages 7 are successively built up in the sense that first one element, e.g. the partition walls, is built up completely up to its end state and subsequently the next element is completely built up. This process is repeated for so long until the component is completed.

It is furthermore possible that the individual elements of the component 1 are not built up completely, but rather only partly, that is first one part of the partition walls 3 is built up, then a part of the covers of the passages 7, then again a part of the partition walls 3, etc. In this respect, a further subtractive machining step can preferably be carried out after a partial build-up.

Figure 4:
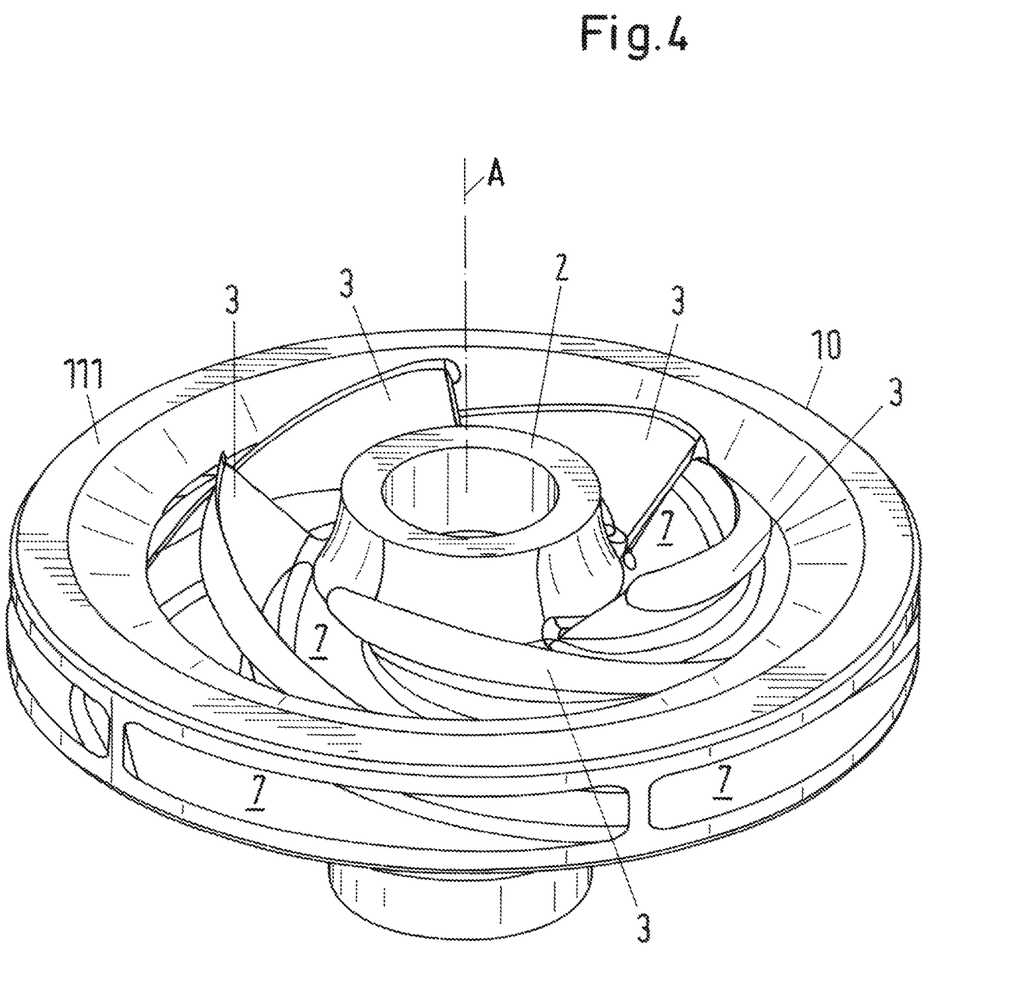
FIG. 4 is a perspective representation of an intermediate state during the build-up production.

FIG. 4 shows as an example in a perspective representation an intermediate state of such a build-up production in which the component 1 is built up element by element. In this example, after the end of the first subtractive machining step, all the still missing regions of the partition walls 3, that is here the blades 3 of the impeller 1, are first built up. FIG. 4 shows the impeller 1 in an intermediate state of build-up production in which the blades 3, that is the partition walls 3 between adjacent passages 7, as well as the hub plate 2 are just built up completely, i.e. in their final form. Subsequently, the still missing region of the top plate 4 is then built up by build-up production in order thus to complete the impeller 1. This completed impeller 1 is shown in FIG. 5.

As already mentioned, in accordance with a preferred embodiment, the build-up production can comprise a plurality of additive machining steps to successively build up the component 1. It is particularly preferred in this respect if at least one further subtractive machining step is carried out between the additive machining steps.

In such a further subtractive machining step, deviations from the desired geometry that have arisen in the preceding additive machining step can, for example, be compensated by cutting production. Milling work or grinding work can thus be carried out in this further subtractive machining step to strip such material of which too much was deposited in the additive machining step or to level, to grind or to similarly treat transitions between adjacent layers.

It is particularly preferred if a respective further subtractive machining step is carried out between two additive machining steps, i.e. the additive machining steps and the further subtractive machining steps are carried out alternately or alternatingly. A particularly high quality and precision of the component 1 can herewith be ensured.

Modern machining tools are known today with which both subtractive machining steps and additive machining steps can be carried out in the same machining chamber without it being necessary in so doing to reclamp the blank 10 or the component 1 or to transfer it to another holder. The blank 10 is only clamped into a holder once and can then be selectively or alternately machined subtractively or additively. Such machining tools comprise a plurality of machining heads for this purpose of which at least one is configured for subtractive production, that is, for example, as a milling tool, and at least one is configured for additive production, that is, for example, as an apparatus for laser build-up welding. After the end of e.g. an additive machining step, the machining tool autonomously changes the machining head and can subsequently carry out a subtractive machining step and vice versa. A particularly fast and highly precise manufacture of the component 1 is hereby made possible.

Although the invention was explained with reference to the production of an impeller 1, the invention is naturally not limited to such components 1 or to their manufacture, but is rather suitable for a plurality of other components 1, in particular for those components 1 in which at least one inner passage 7 is provided whose geometry does not allow it to be worked out in a cutting or subtractive manner from a blank 10 with a justifiable effort.

The component 1 can also in particular be configured as a stator or as a diffuser of a rotary machine, with the rotary machine in particular being a pump or a turbine or a compressor or a compactor or an expander.

The inner passage can, for example, also be a cooling passage, e.g. in a turbine blade, for example a cooling air passage.

What is claimed:

1. A component of a rotary machine formed from a blank, the component comprising:
    a center;
    a boundary surface; and
    at least one inner passage extending from the center to the boundary surface and being at least partly closed, the at least one inner passage being formed by a first subtractive machining in which a part of the at least one inner passage at least comprises an opening of the at least one passage into the boundary surface as well as a cut-out in a top surface, the cut-out being manufactured by the first subtractive machining, and the at least one inner passage subsequently completed by a building up of the blank on the top surface such that the blank has a first portion and the building up forms a second portion, the first and second portions having different microstructures with a transition between the first and second portions, a portion of each of the first and second portions forming a portion of a surface of the at least one inner passage.

2. The component in accordance with claim 1, wherein the at least one inner passage comprises a plurality of inner passages, and adjacent passages of the plurality of inner passages are separated by a partition wall, the partition wall being a blade.

3. The component in accordance with claim 2, wherein each of the adjacent passages of the plurality of inner passages are separated by a respective partition wall, a respective part of each respective inner passage of the plurality of inner passages is manufactured in the first subtractive machining, each respective part at least partially delimiting the opening of each respective inner passage into the boundary surface and partially delimiting an opening of the respective inner passage into a cut-out in the top surface, and each partition wall is completed by the building up.

4. The component in accordance with claim 1, wherein the component is an impeller or a stator or a diffuser of a pump, of a turbine, of a compressor, of a compactor or of an expander.

5. The component in accordance with claim 1, wherein the component is an impeller or a stator or a diffuser of the rotary machine.

6. The component in accordance with claim 1, wherein the at least one inner passage extends from the center to the boundary surface, and is bound by at least one partition wall, the at least one partition wall being completed only by the building up.

7. The component in accordance with claim 1, wherein a start of the at least one passage is disposed at the center and is separated from a central opening by a ring body in a completed state of the component.

8. The component in accordance with claim 1, wherein the building up the blank includes building up the blank from formless material or a neutral-shape material.

* * * * *